United States Patent Office 3,536,668
Patented Oct. 27, 1970

3,536,668
PROCESS FOR THE PRODUCTION OF POLYURETHANE FIBERS
Horst Wieden, Wilhelm Brenschede, Hans Lenz, and Wolfgang Rellensmann, Dormangen, and Gunther Nischk, Leverkusen, Germany, assignors to Farbenfabriken Bayer Aktiengesellschaft, Leverkusen, Germany, a corporation of Germany
No Drawing. Continuation of application Ser. No. 425,337, Jan. 13, 1965. This application May 28, 1968, Ser. No. 739,946
Claims priority, application Germany, Jan. 15, 1964, F 41,746
Int. Cl. C08g 22/10
U.S. Cl. 260—75                                                 9 Claims

ABSTRACT OF THE DISCLOSURE

Polyurethane fibers are prepared by reacting in the absence of a solvent at a temperature less than 120° C. a linear polyester having terminal hydroxyl groups and a hydroxyl number of from about 35 to about 110 with an excess of from about 115 percent to about 300 percent of an aromatic diisocyanate, dissolving this product in a solvent that will dissolve polyacrylonitrile, reacting the solvent solution at a temperature of from about 10° C. to about 50° C. with from about 80 percent to about 120 percent of water based on free —NCO groups present in the product and spinning the solution into a fiber.

---

This is a continuation of application Ser. No. 425,337, filed Jan. 13, 1965, now abandoned.

This invention relates to spandex fibers and a method of preparing the same. More particularly, it relates to a method of preparing such fibers using specific conditions, sequential steps and particular reactants.

It has been heretofore known to produce elastomeric filaments and fibers from linear polyesters comprising hydroxyl groups, aromatic diisocyanates and water. For this purpose, according to U.S. Pat. 2,755,266 for example, the components are reacted with one another in the given sequence in a polyacrylonitrile solvent and the solution obtained is wet-spun or dry-spun (Example 4 of the patent specification).

It has also been heretofore known from Example 7 of U.S. patent specification 3,097,192 to react the polyester and the diisocyanate with one another in the melt, followed by solution of the polyester isocyanate in a polyacrylonitrile solvent, reaction with water and spinning of the solution. This procedure is disadvantageous because biuret groups are formed at temperatures above 50° and these groups are not stable when kept in dimethylformamide. The viscosity of the spinning solutions are too unstable for a process used on a large industrial scale.

It is therefore an object of this invention to provide an improved process for making spinning solutions for the preparation of spandex fibers. It is another object of this invention to provide an improved method of making spandex fibers. It is still another object of this invention to provide spinning solutions for spandex fibers having substantially constant viscosity on storage. It is still another object of this invention to provide spinning solutions for spandex fibers, which solutions are substantially free of branching.

The foregoing objects and others which will become apparent from the following description are accomplished in accordance with the invention generally speaking by providing spandex fibers by an improved process by reacting a linear polyester having terminal hydroxyl groups and an OH number from 35 to 110, advantageously 40 to 70, with an excess of from about 115% to about 300% of an aromatic diisocyanate based on the hydroxyl groups present at a temperature below 120° C., dissolving the reaction product in a solvent that dissolves polyacrylonitrile solvent and reacting the reaction product at about 10 to about 50° C., advantageously from about 18 to about 40° C., with from about 80% to about 120% based on the free NCO groups remaining in the reaction product of water, degasification of the solution obtained in vacuo and spinning into a fiber. The fibers may be either wet-spun or dry-spun.

The maintenance of the above-mentioned quantitative ratios and the temperature conditions is essential for the process according to the invention. According to the prior art, a smaller excess is used during the reaction of the polyester with the diisocyanate, the operation even sometimes taking place in solution or the reaction is effected at a higher temperature. When working at a relatively high temperature, branched polyester isocyanate is obtained in the solution as a consequence of secondary reactions by way of allophanate or isocyanurate groups. This polyester isocyanate is then transformed into an elastomer solution with a large excess of water, carbon dioxide being split off. However, it is not technically possible using equal concentrations to produce consistently solutions of equal viscosity, since it is very difficult always to produce the same degree of branching in the reaction of the polyester with the diisocyanate in dimethylformamide. Furthermore, there is a strong decomposition of allophanate groups in the solvent at slightly raised temperatures under the influence of the excess water. Because of these varying molecular structures the technological textile properties of the filaments and fibers which are obtained cannot always be reproduced. If less than 115% of diisocyanate is used, there are constant thread breakages when spinning the solution by the dry-spinning process. In addition, the threads or filaments adhere very strongly to one another and consequently cannot be rewound. With the wet-spinning process, separation into the individual capillaries is not possible, so that staple fibers cannot be produced.

The highly viscous solutions obtained according to the present invention, having a substantially linear molecular structure, do not cross-link on standing even for a long period. In addition, these solutions do not show any degradation phenomena, either at room temperature or at higher temperature, since as a result of their linear molecular structure no allophanate or biuret groups form in the solvent. After complete degasification in vacuo, they can be spun by the wet or the dry spinning processes.

Any linear polyesters containing terminal hydroxyl groups, having a hydroxyl number of from about 35 to about 110, preferably from about 40 to about 70 and an acid number below about 10 and preferably between 0 and 3, can be used in accordance with this invention such as, for example, those prepared by reacting a lactone with a suitable initiator such as those disclosed in U.S. Pats. 2,890,208, 2,933,478 and 2,990,379 and those prepared by reacting a dicarboxylic acid with a dihydric alcohol. Any suitable dicarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, thiodibutyric acid, sulfonyldibutyric acid, maleic acid, fumaric acid, citraconic acid, itaconic acid and the like. Any suitable dihydric alcohol may be used in the reaction with the dicarboxylic acid to form a polyester such as, for example, ethylene glycol, diethylene glycol, propylene glycol, butylene glycol, neopentyl glycol, amylene glycol, hexanediol, hexahydroxylene glycol, bis-(hydroxymethyl-cyclohexane) and the like. Of course, the hydroxyl polyester may contain urethane groups, urea groups, amide groups, chalkogen groups and the like.

Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenylpropane-4,4'-bis-hydroxy ethyl ether and the like. It is desirable to use those polyesters of wihch the acids and glycols contain a relatively large number of carbon atoms, particularly in order to obtain water-repellant filaments or fibers. It is preferred to use polyesters having a melting point below 60° C.

These polyesters are caused to react in the melt and in known manner with an excess of aromatic diisocyanates at temperatures below about 120° C. and advantageously at temperatures between about 65 and about 100° C. With an excess of at least about 115% of diisocyanates, adducts are formed of which the chains are scarcely lengthened and carry free isocyanate groups. It is obviously possible, and frequently very desirable, for the proportion of the diisocyanate to be further increased so that free diisocyanate is present in the melt in addition to the polyester-diisocyanate adducts. By this increase in the quantity of diisocyanate, it is possible to vary considerably the ratio between soft and hard molecule segments and thus also the elongation at break, the permanent elongation and the E-modulus of the filaments and fibers formed in the spinning process.

Any suitable aromatic diisocyanate may be used such as, for example, p-phenylene diisocyanate, 1,5-naphthylene diisocyanate, 4,4'-diphenylmethane diisocyanate, 3,3'-dimethyl - 4,4' - diphenylmethane diisocyanate, 4,4'-diisocyanatostilbene, 4,4'-diisocyanatodibenzyl and mixtures of 2,4- and 2,6-toluylene diisocyanate, diphenyl-4,4'-diisocyanate and the like. It is preferred to use symmetical aromatic diisocyanates and 4,4'-diphenylmethane diisocyanate is most preferred.

The isocyanate-modified polyesters with free isocyanate groups as thus prepared are then dissolved in that quantity of polyacrylonitrile solvent which is necessary for the requried final concentration and caused to react at 10 to 50° C., advantageously at 18 to 40° C., with 80 to 120% of water, based on the free isocyanate groups which are present. When using water in a quantity less than that necessary for equivalence, the deficiency is not to fall below 20% based on the equivalent quantity.

Any suitable solvent that will dissolve polyacrylonitrile may be used such as, for example, dimethylformamide, dimethylacetamide, dimethylsulphoxide, dimethoxydimethyl acetamide and the like. They must be free from constituents which are capable of reacting with diisocyanates although they can contain the usual technical quantity of water and this quantity must then be taken into account as part of the total quantity of water.

When carrying out the reaction, it is not necessary for the isocyanate-modified polyester to be initially dissolved in the quantity of solvent necessary for the required final condensation and then reacted with the water; the isocyanate-modified polyester can be first of all dissolved in a smaller quantity of solvent, whereupon the water necessary for the further reaction, possibly already dissolved in more solvent, is added, dilution being effected during the reaction to the required final concentration. According to a preferred embodiment, however, the water in that quantity of solvent which is necessary for the required final concentration is added immediately to the isocyanate-modified polyester. Reaction is allowed to take place for several hours, for example, between 4 and 48 hours, at 10–50° C. and preferably at 18–40° C., and the spinning solution is subjected to vacuum degasification. The solid content of the solution is generally between 10 and 35%. According to another embodiment, it is possible after the reaction of the water with the polyester-isocyanate, to add to the solution at temperatures below 50° C. up to another 10% but advantageously 3 to 7% of an aliphatic polyisocyanate, based on the solid content of the existing solution. Suitable aliphatic isocyanates which include cycloaliphatic polyisocyanates are, for example, 1,4-tetramethylene diisocyanate, 1,6-hexamethylene diisocyanate, the reaction products of three mols each of the two aforesaid isocyanates with one mol each of water and one mol of a triol, hexahydro-p-phenylene diisocyanate, 4,4'-dicyclohexylmethane diisocyanate and 3,3'-dimethyl-4,4'-dicyclohexylmethane diisocyanate and the like.

It is also possible to add compounds which cause a retardation or acceleration of the polyaddition reactions. With diisocyanates which react particularly quickly, retarding agents, such as acids or acid halides (adipic acid, hydrochloric acid, benzoyl chloride) can be added in the first phase of the reaction between polyester and diisocyanate. During the later reaction with water, it is frequently desirable to produce acceleration by tertiary amines or heavy metal salts.

The spinnable solutions prepared as described have an excellent stability at room temperature or slightly raised temperature. No break-down of the solutions has been observed, even on relatively long storage. Using the known methods in the spinning art, the solutions are spun to form elastic filaments or fibers, either dry, i.e., at high temperature in air or inert gases, or wet, i.e. by injection into coagulation baths. Elastomeric fibers are obtained which have outstanding technological textile properties, i.e. high tensile strength, low permanent elongation, and high E-modulus. An additional advantage is that the separate capillaries can be easily separated again after coagulation, so that such fibers can readily be used as staple fibers.

The invention is further illustrated but not limited by the following examples in which parts are by weight unless otherwise specified.

EXAMPLE 1

About 250 parts of polyester (OH number 55.3) of adipic acid, 1,6-hexanediol and 2,2-dimethyl-1,3-propanediol, in the molar ratio 8:7:1, are completely melted at about 75° C. and 93.8 parts of 3.4'-diphenylmethane diisocyanate are added with stirring. The melt is kept for about 30 minutes at from about 75 to about 80° C. and is then dissolved in about 805 parts of dimethylformamide containing about 0.03% of $H_2O$, and quickly cooled to 25° C. With thorough mixing, about 4 parts of water are added dropwise to the reaction solution. Carbon dioxide is evolved and the viscosity necessary for spinning purposes is reached after about 24 hours. The solid content of the spinning solution is about 30%.

EXAMPLE 2

About 250 parts of the polyester of Example 1 are completely melted at about 75° C. and about 109.4 parts of 4,4'-diphenylmethane diisocyanate are added with stirring. The melt is kept for about 30 minutes at from about 75 to about 80° C.

(a) The melt is dissolved in about 1095 parts of dimethylformamide containing about 0.03% of $H_2O$ and cooled to about 25° C. About 5 parts of water are added to the solution while mixing thoroughly. The viscosity of the solution slowly increases with evolution of $CO_2$. After about 25 hours, the final viscosity suitable for spinning is reached. The solid content of the spinning solution is about 25%.

(b) The melt is dissolved in about 984 parts of dimethylformamide containing about 0.03% of $H_2O$ at a temperature of about 40° C. and about 5 parts of water are added dropwise to the solution while mixing thoroughly. The viscosity rapidly increases with evolution of $CO_2$. After about 12 hours at about 35 to about 40° C., the final viscosity is reached and the solid content of the solution is about 27%.

EXAMPLE 3

About 7500 parts of the polyester of Example 1 are completely melted at about 70° C. The necessary quantity of 4,4'-diphenylmethane diisocyanate, according to the type of the elastomer solution which is required, is added and the melt kept for about 45 minutes at about 75 to about 80° C. The quantity of dimethylformamide necessary for adjusting the required final concentration is then introduced. The dimethylformamide has the required amount of water dissolved therein for further reaction. Reaction temperature of about 40° is provided, but the solution is cooled over a period of 10 to 20 minutes from about 30 to about 35° C. The final viscosity of the solution suitable for spinning purposes is reached after 20 hours with evolution of $CO_2$.

For the purpose of pigmentation, if desired, the required quantity of titanium dioxide is also incorporated by stirring into the elastomer solution.

In the following table, the parts employed for different types of solutions are indicated:

| Type | 4,4'-diphenyl-methane diisocyanate | Dimethyl-formamide (0.02% $H_2O$ content) | Water | Titanium dioxide | Solid content, percent |
| --- | --- | --- | --- | --- | --- |
| (a) | 2,814 | 31,330 | 129 | | 25 |
| (b) | 2,850 | 28,160 | 112 | 496 | 27 |
| (c) | 2,343 | 29,820 | 99 | | 25 |
| (d) | 2,109 | 26,950 | 76 | 475 | 27 |

EXAMPLE 4

About 250 parts of polyester (OH number 61.5) of adipic acid, ethylene glycol and 1,2-propanediol in the molar ratio 4:3:1 are completely melted at about 75° C. and reacted while stirring for about 30 minutes at about 75 to about 80° C. with about 86.5 parts of 4,4'-diphenylmethane diisocyanate. The melt is dissolved in about 1020 parts of dimethylformamide, containing about 0.01% of $H_2O$, and is cooled in about 15 minutes to about 25° C. About 3.5 parts of water are then added dropwise to the reaction solution. With evolution of $CO_2$, the solution viscosity suitable for spinning purposes is reached after about 20 hours. The solid content of the solution is about 25%.

THE SPINNING OF THE SOLUTIONS DESCRIBED IN EXAMPLES 1–4 TO FORM ENDLESS ELASTOMERIC FILAMENTS

The solutions described in Examples 1–4 and having stable viscosities from 500–1000 poises at about 20° C. measured in a Hoppler viscosimeter, are filtered prior to spinning through a filter press and thereafter evacuated until free from bubbles.

(I) Wet-spinning process

The well-filtered and evacuated solution is spun by means of a spinning pump through a multi-aperture nozzle with nozzle diameters from 75 to 200μ into a water bath with a length of 2 to 6 metres which is heated to from about 20 to about 70° C., preferably from about 40 to about 50° C. The water bath contains 2–10% of dimethylformamide. The filaments obtained are withdrawn at a speed from 10–50 m./min. with a drafting of 0.5–4.5. After subsequent drying at 70° C., they are wound onto tubes.

The physical properties of the filaments thus obtained are to be seen in Table I.

(II) Dry-spinning process

The thoroughly filtered and evacuated solution is supplied by means of a spinning pump to the spinning head, which is preheated to between 30 and 90° C., depending on the solution viscosity, and is injected through a multi-aperture nozzle with nozzle aperture diameters from 100 to 250μ into a shaft heated to from about 210 to about 230° C. The temperature of the injection air must be chosen to be so high that the air temperature at the spinning nozzle is from about 175 to about 200° C. With withdrawal speeds of 200–800 m./min. advantageously 350 to 500 m./min., and a shaft drafting of 3–18, advantageously 8–12, optimum values of the physical properties for the filaments are produced, these values being indicated in Table II for different types of solutions. The dimethylformamide content of the filaments spun under these conditions is less than 1%.

TABLE I.—PROPERTIES OF WET-SPUN ELASTOMER FILAMENTS

| Solution Example | Count denier | Strength,[1] g./denier | Elongation[1] at break, percent | Permanent[2] elongation, percent | E-modulus 150%, kp./mm.[2] |
| --- | --- | --- | --- | --- | --- |
| 1 | 540 | 0.55 | 400 | 15 | 0.51 |
| 2(a) | 540 | 0.45 | 350 | 20 | 0.60 |
| 2(b) | 480 | 0.52 | 400 | 18 | 0.53 |
| 3(a) | 480 | 0.55 | 400 | 15 | 0.53 |
| (Ribbon) | 45,000 | 0.49 | 500 | 16 | 0.48 |
| 3(c) | 480 | 0.41 | 400 | 12 | 0.45 |
| 4 | 480 | 0.49 | 400 | 10 | 0.50 |

See footnotes at end of Table II.

TABLE II.—PROPERTIES OF DRY-SPUN ELASTOMER FILAMENTS

| Solution Example | Count denier | Strength,[1] g./denier | Elongation[1] at break, percent | Permanent[2] elongation, percent | E-modulus 150% kp./mm.[2] |
| --- | --- | --- | --- | --- | --- |
| 3(a) | 170 | 0.95 | 550 | 18 | 0.4 |
| 3(b) | 140 | 0.93 | 600 | 15 | 0.41 |
| 3(c) | 140 | 0.82 | 650 | 12 | 0.3 |
| 3(d) | 150 | 0.78 | 650 | 11 | 0.33 |

[1] Strength and elongation determined by means of a Schroder apparatus, stretching speed 400%/17 seconds.
[2] Permanent elongation in percent after being stretched three times to 300% with a stretching and relaxing speed of 150 mm./min. after a recovery time of 60 seconds.

It is of course to be understood that any of the polyesters, isocyanates or solvents mentioned above may be used in the examples in place of those specified.

Although the invention has been described in considerable detail in the foregoing for the purpose of illustration, it is to be understood that such detail is soley for this purpose and that variations can be made by those skilled in the art without departing from the spirit and scope of the invention except as is set forth in the claims.

What is claimed is:

1. A process for the production of fibers which comprises:
  (A) reacting in the absence of a solvent at a temperature less than 120° C. a linear polyester having terminal hydroxyl groups and a hydroxyl number of from about 35 to about 110 with an excess of from about 115 percent to about 300 percent, based on the polyester hydroxyl groups present, of an aromatic diisocyanate,
  (B) dissolving the product of step (A) in a solvent which will dissolve polyacrylonitrile,
  (C) reacting the product of step (B) at a temperature of from about 10° C. to about 50° C. with from about 80 percent to about 120 percent of water based on free —NCO groups present in the product of step (B), and (D) spinning solution (C) into a fiber.

2. The process of claim 1 wherein prior to conducting step (D) the solution of step (C) is degasified in vacuo.

3. A polyurethane fiber prepared by the process of claim 1.

4. The process of claim 1 wherein the reaction with water is conducted at a temperature of from about 18° C. to about 40° C.

5. The process of claim 1 wherein the polyester has an hydroxyl number of about 40 to about 70.

6. The process of claim 1 wherein the aromatic diisocyanate is 4,4'-diphenylmethane diisocyanate.

7. The process of claim 1 wherein the reaction with water is conducted at a temperature of from about 18 to about 40° C.

8. A process for the production of fibers which comprises:
- (A) reacting in the absence of a solvent at a temperature less than 120° C. a linear polyester having terminal hydroxyl groups and a hydroxyl number of from about 35 to about 110 with an excess of from about 115 percent to about 300 percent, based on the polyester hydroxyl groups present, of an aromatic diisocyanate,
- (B) dissolving the product of step (A) in a solvent which will dissolve polyacrylonitrile,
- (C) reacting the product of step (B) at a temperature of from about 10° C. to about 50° C. with from about 80 percent to about 120 percent of water based on free —NCO groups present in the product of step (B),
- (D) reacting the product of step (C) at a temperature less than 60° C. with up to 10 percent based on the solid content of the solution of an aliphatic diisocyanate, and
- (E) spinning solution (D) into a fiber.

9. The process of claim 8 wherein the aliphatic diisocyanate is present in an amount of from about 3 to about 7 percent based on the solid content of the solution.

References Cited

UNITED STATES PATENTS 3,097,192   7/1963   Schilit _____ 260—75

DONALD E. CZAJA, Primary Examiner

M. J. WELSH, Assistant Examiner

U.S. Cl X.R.

260—37; 264—184, 205